United States Patent Office 3,297,084
Patented Jan. 10, 1967

3,297,084
MISCIBLE FLOOD VISCOSITY CONTROL
THROUGH pH REGULATION
William B. Gogarty and William C. Tosch, Littleton,
Colo., and Claude P. Coppel, Woburn, Mass., assignors
to Marathon Oil Company, Findlay, Ohio, a corporation of Ohio
No Drawing. Filed Sept. 9, 1963, Ser. No. 307,338
18 Claims. (Cl. 166—9)

This invention relates to the recovery of fluid hydrocarbons from subterranean formations by injecting into a formation a slug of soluble oil of modulated viscosity, driving the slug through the formation with a drive fluid, and recovering the displaced oil from the formation.

Petroleum may be recovered from subterranean formations by injecting a slug of soluble oil into the formation and driving the soluble oil slug through the formation with water. The soluble oil is compatible with petrolum and achieves an almost perfect recovery of oil from the portions of a formation swept. "Compatible" as used herein is synonymous with "miscible" except that the internal phase is substantially immiscible with the substance the external phase is designed to contact. The soluble oils utilized in the process of this invention are known as "microemulsions" (Schulman and Montaghe, Annals of the New York Academy of Sciences, 92, pages 366–71 (1961)), oleopathic hydromicelles (Hoar and Schulman, Nature, 152, page 102 (1943)), or transparent emulsions (Flair, Jr. et al., United States Patent 2,356,-205). This procedure is more fully described in copending United States patent application Serial No. 212,-134, filed on July 24, 1962.

The soluble oils used in petroleum recovery to date have used an alkylaryl naphthenic monosulfonate surfactant. The addition of water to these soluble oils increases their apparent viscosity. Apparent viscosity is defined as the ratio of shear stress to rate of shear, the shear stress exhibited by the liquid being the result of the particular rate of shear. For this reason, the viscosity of the soluble oil slug can vary from point to point. The sorption of water can occur in formations containing appreciable amounts of water; for example, in a tertiary flood undertaken after completion of a water flood. In such a situation, the leading edge of the slug of soluble oil as well as the trailing edge of the slug will contact large volumes of water and will tend to take up some of this water. The slug would also take up water from a slug of water-external emulsion which might be injected after the soluble oil to form a bank, of two slugs, which would be compatible at both the leading and trailing edges of the bank.

The viscosity of the soluble oil or emulsion can be regulated, in part, by controlling the amount of oil in the slug or by controlling the viscosity of the oil utilized; however, less expensive control mechanisms were needed. The present invention accomplishes this result.

We have now discovered that the addition of water-soluble acids and bases (also termed "ionic additives") to soluble oils effectively reduces viscosity of these materials. This result is surprising as these materials are generally regarded as deleterious to the performance of surfactants. In addition, increasing amounts of acids and bases temperature stabilize the sulfonate-coupled soluble oils. For this reason, these soluble oils containing regulated amounts of acids or bases can now be utilized in formations where they might not have been used heretofore because of high formation temperatures.

The term soluble oil, as used in this application, includes the usual soluble oils of commerce which are mixtures of nonpolar compounds, such as hydrocarbons, and one or more surfactants. It also includes the nonturbid oil-external dispersions containing water which are prepared from the soluble oils of commerce wherein the average diameter of the internal phase is less than the wave length of light.

Essentially, this invention comprises adding to a soluble oil small amounts of a water-soluble acid or base prior to injecting the soluble oil into an oil bearing formation to ameliorate viscosity problems occurring at soluble oil-water interfaces.

A variety of water-soluble ionic acids or bases exhibit the desired effect, though it appears that the allowable concentration range decreases as the valence of the ion making up the acid or base increases. Among the acids useful in the process are included nitric acid, acetic acid, hydrochloric acid, hydrobromic acid, sulfuric acid, citric acid, propionic acid, boric acid, phosphoric acid, etc. Preferred acids include sulfuric acid, hydrochloric acid, nitric acid, phosphoric acid, and acetic acid. Alkali metal hydroxides are preferred, particularly sodium hydroxide, though other bases such as ammonia are operative.

The amount of acid or base required varies with the amount of viscosity reduction or stability increase desired. It appears that the maximum allowable concentration varies with the percentage of water and/or alcolhol present, and the particular sulfonate and quantity of sulfonate utilized. Generally, no more than about 0.1–2.0% by weight acid or base (based on surfactant weight) is needed for a desired viscosity reduction. Ionic additive can be added to a soluble oil in amounts at least up to about $20.0 \times 10^{-2}$ to $32.0 \times 10^{-2}$ moles of ions per liter.

The desired amount of ionic additive and the maximum amount of ionic additive for a particular soluble oil can be routinely determined by adding increasing amounts of ionic additive to aliquots of the micellar material until the desired viscosity or the "breaking point" is reached.

Viscosity control can be achieved in a number of ways. Thus, ionic additive content can be uniform throughout the slug if no water sorption problems are present; the viscosity of the soluble oil can be gradually reduced by gradually increasing the ionic additive content of the slug being injected into a formation, or the viscosity of the trailing edge of the slug can be decreased by addition of ionic additive. The viscosity of the trailing edge of the slug will ultimately be increased to the viscosity of the remaining portion of the slug as $H_2O$ from a drive system mixes into the trailing edge of the slug. Alternately, ionic additive can be included in both the leading and/or trailing edges of a soluble oil slug so as to reduce the apparent viscosity peaks occurring as these portions of the slug push or are pushed by water.

The following examples more fully illustrate our invention; however, it is not intended that our invention be limited to the particular ionic additive, the particular sulfonate surfactants, etc., shown. Rather, it is intended that all equivalents obvious to those skilled in the art be included within the scope of our invention as claimed.

*Example I*

A pure alkylaryl naphthenic monosulfonate was isolated from its solution in crude oil by dissolving the crude solution in 60% aqueous ethanol and extracting the oil with hexane. The alkylaryl naphthenic monosulfonate was found to have an average molecular weight of about 458 and an empirical formula approximating $C_nH_{2n-10}SO_3Na$, wherein $n=25-30$ and the alkyl portion of the molecule contains from about 5 to about 20 carbon atoms. This surfactant was produced by Shell Chemical Company. After completion of extraction with hexane, the ethanol-water solvent was then removed by filtration. The dry surfactant, containing some inorganic salts, was taken up in absolute ethanol and filtered. The ethanol-treated surfactant was found to be salt free.

The pure surfactant was utilized to make up a stock solution of surfactant and straight run gasoline wherein the gasoline contained 0.1 gram of surfactant per milliliter of straight run gasoline. This solution was used to make up a soluble oil of the formulation: 20% distilled water, 4% isopropanol, and 76% stock solution. A portion of the soluble oil was divided into 50 ml. aliquots and sodium hydroxide, on a weight-percent basis, was added to the soluble oil. The following table describes the result of adding various amounts of base to the soluble oil.

| Wt.-Percent NaOH Based on Surfactant Weight | Stability at 24 hrs. | Viscosity 72° F., 6 r.p.m. |
|---|---|---|
| 0.0 | Two phase—delicate interface. | Approx. 8.9 cp. |
| 0.2 | One phase | 6.9 cp. |
| 0.4 | ___do___ | 6.5 cp. |
| 0.6 | ___do___ | 5.6 cp. |
| 0.8 | ___do___ | 3.55 cp. |
| 1.0 | Two phase | The water-like bottom layer increases in volume with increasing base. |
| 1.5 | ___do___ | |
| 2.0 | ___do___ | |
| 3.0 | ___do___ | |

*Example II*

To 50 ml. aliquots of the soluble oil of Example I hydrochloric acid was added in the following amounts with the described result:

| Wt.-Percent HCl | Stability | Viscosity 72° F., 6 r.p.m. |
|---|---|---|
| 0.2 | One phase | 7.1 cp. |
| 0.4 | ___do___ | 5.1 cp. |
| 0.6 | Two phase | 0.5% water-like bottom layer. |
| 0.8 | ___do___ | The water-like bottom layer increases in volume with increasing base. |
| 1.0 | ___do___ | |
| 2.0 | ___do___ | |

*Example III*

The effect of sulfuric acid on the soluble oil described in Example I is set out in the following table:

| Wt.-Percent $H_2SO_4$ | Stability | Viscosity 72° F., 6 r.p.m. |
|---|---|---|
| 0.2 | One phase | 6.4 cp. |
| 0.4 | ___do___ | 6.4 cp. |
| 0.6 | ___do___ | 6.1 cp. |
| 0.8 | ___do___ | 4.25 cp. |
| 1.0 | ___do___ | 3.55 cp. |
| 2.0 | Two phases | Water-like bottom layer. |

*Example IV*

Oil is recovered from a Pennsylvanian sand of the Illinois Basin at a depth of about 950 feet by the injection of 3 slugs of soluble oil followed by a water injection through the 4 injection wells of a regular five-spot pattern. The sand section is about 10 feet in thickness, has a permeability of about 150 md., an oil saturation of about 35%, and a water saturation of 65% of the pore volume. The crude viscosity is about 7.0 cp. at 21° C.

Fifteen thousand five hundred barrels of a soluble oil are prepared containing 20% deionized water, 4% isopropanol, and 76% of a surfactant-straight run gasoline mixture. The sufactant is the same surfactant as utilized in Example I and is mixed with the gasoline at a ratio of 0.1 gram of surfactant per milliliter of straight run gasoline. The soluble oil is divided into 3 slugs of 1,500 bbls.; 12,500 bbls.; and 1,500 bbls. of soluble oil, respectively, and injected into the formation. Into the first and last slugs is uniformly mixed 1.0%, by weight of surfactant, sulfuric acid while 0.2% by weight of surfactant, hydrochloric acid is uniformly mixed into the 12,500-barrel slug. The viscosities of the soluble oil slugs are about 3.5; 7.0; and 3.5 cp., respectively.

After completion of injection of the soluble oil slugs, substantially pure water is injected into the formation at 60–150 bbls./day. Water injection is continued until economic recovery through the central well of the five-spot is no longer economical.

*Example V*

In a variation of the process of Example IV, a slug of water-external emulsion having a viscosity of about 7.0 at its leading edge and about the viscosity of water at its trailing edge is injected into the formation prior to the injection of water.

In practice of the processes shown in the last two examples, the viscosity of the soluble oil in contact with formation water, which it drives along with the oil in the formation, rises as water is mixed into the slug. The ionic additive-treated portion of the soluble oil injected last also increases in viscosity on contact with a water drive or with a water-external emulsion slug which is, in turn, driven by water. The amount of viscosity increase, in both instances, will depend on the amount of water mixed into the soluble oil slug. The final viscosity is always lower than it would be without the ionic additive. This result occurs because (a) it is desirable to inject into a formation a soluble oil which contains an excess of oil sufficient to enable a considerable amount of water to be mixed into the soluble oil while retaining the oil-external character of the system and (b) high oil-content soluble oils have lower apparent viscosities than do higher water-content soluble oils and the viscosities of the high oil-content soluble oils increase as water is mixed into the soluble oil.

Normally, only 5–10% of the total soluble oil slug need be ionic additive treated unless total additive treatment is required for temperature stability or for other reasons. Larger or smaller amounts can be treated if the situation demands.

Now having described our invention, what we claim is:
1. The process comprising
   (a) injecting into a petroleum-containing subterranean fomation, into which at least one each of an injection well and a production well have been drilled, a soluble oil, at least a portion of which contains a controlled amount of an ionic additive effective to reduce the viscosity thereof;
   (b) thereafter injecting into the formation a drive fluid; and
   (c) recovering petroleum from the subterranean formation though the production well.
2. The process of claim 1 wherein the soluble oil contains less than about $20.0 \times 10^{-2}$ to about $32.0 \times 10^{-2}$ moles of ions per liter.
3. The process of claim 1 wherein the soluble oil contains a sulfonate surfactant.
4. The process of claim 1 wherein the soluble oil contains an alkylaryl naphthenic monosulfonate having an empirical formula approximating $C_nH_{2n-10}SO_3Na$, wherein $n=25-30$ and the alkyl radical contains from about 5 to about 20 carbon atoms.
5. The process of claim 1 wherein the ionic additive is selected from the group consisting of alkali metal hydroxides and mineral acids.
6. The process of claim 1 wherein the ionic additive is sodium hydroxide.
7. The process of claim 1 wherein the ionic additive is sulfuric acid.
8. The process of claim 1 wherein the ionic additive is hydrochloric acid.
9. The method of controlling the viscosity of a soluble oil suitable for petroleum recovery from subterranean formations comprising mixing into said soluble oil an amount of an ionic additive effective to reduce the viscosity of the soluble oil while maintaining the soluble oil substantially stable.

10. The process of claim 9 wherein the ionic additive is selected from the group consisting of alkali metal hydroxide and mineral acids.

11. The process of recovering fluid hydrocarbons from subterranean formations having at least one injection well and at least one production well drilled into said formation comprising injecting into the subterranean fluid hydrocarbon-containing formation a soluble oil containing an alkylaryl naphthenic sulfonate surfactant, at least one portion of which contains, at major soluble oil-water interfaces, an amount of an ionic additive effective to reduce the viscosity of the soluble oil while maintaining the soluble oil substantially transparent.

12. The process of claim 11 wherein the viscosity of the soluble oil is regulated by mixing into the soluble oil up to about 0.1 to about 2.0% by weight based on the weight of surfactant of an ionic additive.

13. The process for recovering petroleum fluids from subterranean formations containing same comprising
 (a) injecting, through at least one injection well drilled into said formation, a minor portion of a soluble oil containing an ionic surfactant and an amount of ionic additive effective to reduce the viscosity of the soluble oil while maintaining soluble oil as such;
 (b) injecting into the formation a soluble oil of lesser ionic additive content and higher viscosity;
 (c) injecting a second minor portion of a soluble oil containing an amount of ionic additive effective to reduce the viscosity of the soluble oil while maintaining the soluble oil as such;
 (d) injecting, through said injection well, a drive fluid; and
 (e) recovering oil from said formation through at least one production well drilled therein.

14. The process of claim 13 wherein the minor portions of soluble oil contain less than about 0.1–2.0% by weight based on the weight of surfactant of ionic additive.

15. The process of claim 13 wherein the ionic additive is selected from the group consisting of alkali metal hydroxide and mineral acids.

16. The process of claim 13 wherein the soluble oil contains as ionic surfactant an alkylaryl naphthenic monosulfonate having an empirical formula approximating $C_nH_{2n-10}SO_3M$, wherein M is an alkali metal, $n = 25$–$30$, and the alkyl radical contains from about 5 to about 20 carbon atoms.

17. The process of claim 13 wherein at least one portion of at least about 5–10% of the total soluble oil contains an amount of ionic additive greater than the remaining portion.

18. The process for the recovery of petroleum fluids from subterranean formations having at least one injection well and at least one production well drilled therein comprising injecting into the subterranean formation sequentially slugs of soluble oils of incrementally increased ionic additive content and incrementally reduced viscosity.

References Cited by the Examiner

UNITED STATES PATENTS

| 3,082,822 | 3/1963 | Holm et al. | 166—9 |
| 3,126,952 | 3/1964 | Jones | 166—9 |
| 3,163,214 | 12/1964 | Csaszar | 166—9 |
| 3,181,609 | 5/1965 | Csaszar et al. | 166—9 |

CHARLES E. O'CONNELL, *Primary Examiner.*

JACOB L. NACKENOFF, *Examiner.*

T. A. ZALENSKI, *Assistant Examiner.*